US012568540B2

(12) United States Patent
Sedin et al.

(10) Patent No.: US 12,568,540 B2
(45) Date of Patent: Mar. 3, 2026

(54) MULTI-LINK COMMUNICATION IN A WIRELESS COMMUNICATION NETWORK

(71) Applicant: Telefonaktiebolaget LM Ericsson (publ), Stockholm (SE)

(72) Inventors: Jonas Sedin, Brentford (GB); Charlie Pettersson, Solna (SE); Leif Wilhelmsson, Lund (SE); Dennis Sundman, Sollentuna (SE); Sebastian Max, Cologne (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 425 days.

(21) Appl. No.: 18/004,823

(22) PCT Filed: Jul. 10, 2020

(86) PCT No.: PCT/EP2020/069602
§ 371 (c)(1),
(2) Date: Jan. 9, 2023

(87) PCT Pub. No.: WO2022/008079
PCT Pub. Date: Jan. 13, 2022

(65) Prior Publication Data
US 2023/0254740 A1       Aug. 10, 2023

(51) Int. Cl.
*H04W 76/15* (2018.01)
*H04W 36/00* (2009.01)
(Continued)

(52) U.S. Cl.
CPC ....... *H04W 76/15* (2018.02); *H04W 36/0069* (2018.08); *H04W 36/18* (2013.01); *H04W 36/023* (2013.01)

(58) Field of Classification Search
CPC . H04W 76/15; H04W 36/0069; H04W 76/19; H04W 36/18; H04W 36/023; H04W 76/10
See application file for complete search history.

(56) References Cited

U.S. PATENT DOCUMENTS

2017/0311206 A1* 10/2017 Ryoo ..................... H04W 24/02
2018/0054832 A1    2/2018 Luo et al.
(Continued)

FOREIGN PATENT DOCUMENTS

EP       2235849 A0   10/2010
EP       2922344 A1   9/2015
(Continued)

OTHER PUBLICATIONS

EPO Communication dated Nov. 28, 2023 for Patent Application No. 20739664.9, consisting of 8 pages.
(Continued)

*Primary Examiner* — Allahyar Kasraian
(74) *Attorney, Agent, or Firm* — Weisberg I.P. Law, P.A.

(57) ABSTRACT

A system includes a device configured to be connected to a first node and a second node. The first and second nodes are located in different entities in a wireless network, a controller configured to cause initiation and establishment of a multi-link connection. The multi-link has at least two links connecting the device with the first and/or the second node. Each link is configured to communicate with the first node and/or the second node. The first node is configured to transmit a request for establishing the connection to the second node. The second node is configured to cause and transmit a confirmation for establishing the connection to the first node and/or the device at reception of the request. The first node and second nodes, at establishment of the connection, are configured to function as a node entity associ-
(Continued)

ated with the device and to cause communication with the device over the connection.

18 Claims, 12 Drawing Sheets

(51) Int. Cl.
*H04W 36/18* (2009.01)
*H04W 36/02* (2009.01)

(56) References Cited

U.S. PATENT DOCUMENTS

| | | | | |
|---|---|---|---|---|
| 2018/0124865 | A1* | 5/2018 | Lee | H04W 8/04 |
| 2018/0206174 | A1 | 7/2018 | Zhou et al. | |
| 2018/0227819 | A1 | 8/2018 | Lee et al. | |
| 2019/0059031 | A1* | 2/2019 | Hahn | H04W 76/15 |
| 2019/0246429 | A1 | 8/2019 | Takinami et al. | |
| 2019/0335379 | A1* | 10/2019 | Joseph | H04L 1/189 |
| 2019/0335454 | A1 | 10/2019 | Huang et al. | |
| 2021/0212150 | A1 | 7/2021 | Chu et al. | |
| 2021/0392571 | A1* | 12/2021 | Kneckt | H04W 48/10 |
| 2023/0007716 | A1 | 1/2023 | Inohiza | |
| 2025/0267743 | A1 | 8/2025 | Fang et al. | |

FOREIGN PATENT DOCUMENTS

| | | |
|---|---|---|
| EP | 3528530 A1 | 8/2019 |
| EP | 3654703 A1 | 5/2020 |
| WO | 2018068260 A1 | 4/2018 |
| WO | 2020/050773 A1 | 3/2020 |
| WO | 2020112244 A2 | 6/2020 |

OTHER PUBLICATIONS

EPO Communication dated Nov. 29, 2023 for Patent Application No. 20739968.4, consisting of 7 pages.

3GPP TSG SA WG2 Meeting #65 TD S2-083355; Title: Discussion about ANDSF; Agenda Item: 8.1.5; Source: Huawei; Work Item/Release: SAES/Release 8; Document for: Approval/Discussion; Date and Location: May 12-16, 2008, Prague, Czech Republic, consisting of 5 pages.

I. Jang et al.; Indication of Multi-Link Information; doc.: IEEE 802.11-20/0028r6; IEEE-SA Mentor, vol. 802.11; Jan. 13, 2020, consisting of 14 pages.

International Search Report and Written Opinion dated Feb. 17, 2021 for International Application No. PCT/EP2020/069602 filed Jul. 10, 2020, consisting of 10 pages.

International Search Report and Written Opinion dated Feb. 15, 2021 for International Application No. PCT/EP2020/069598 filed Jul. 10, 2020, consisting of 10 pages.

Khorov, E. et al., Current Status and Directions of IEEE 802.11be, the Future Wi-Fi 7; IEEE Access; vol. 8, May 8, 2020, consisting of 25 pages.

Lopez-Perez, D. et al., IEEE 802.11bep—Extremely High Throughput: The Next Generation of Wi-Fi Technology Beyond 802.11ax; Feb. 12, 2019, consisting of 7 pages.

Linan et al., Consideration on Multi-AP Coordination; doc: IEEE 802.11-19/1129r2; Sep. 6, 2019, consisting of 9 pages.

Huang, P. et al., Multi-link Setup Follow Up II; doc: IEEE 802.11-20/0387r3; Mar. 9, 2020, consisting of 16 pages.

Au, E., Compendium of straw polls and potential changes to the Specification Framework Document; doc: IEEE 802.11-20/0566r23; IEEE P802.11 Wireless LANs; May 23, 2020, consisting of 77 pages.

3GPP TR 25.922 V7.1.0; 3rd Generation Partnership Project; Technical Specification Group Radio Access Network; Radio resource management strategies (Release 7); Mar. 2007, consisting of 95 pages.

IEEE Standards Association; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society, Sponsored by the LAN/MAN Standards Committee; IEEE Std 802.11-2016 (Revision of IEEE Std 802.11-2012), consisting of 3534 pages.

3GPP TS 25.331 V16.0.0; 3rd Generation Partnership Project; Technical Specification Group Radio Access Network; Radio Resource Control (RRC); Protocol specification (Release 16); Mar. 2020, consisting of 2319 pages.

Summons to attend oral proceedings pursuant to Rule 115(1) EPC dated Aug. 21, 2024 for Application No. 20 739 968.4, consisting of 8 pages.

Summons to attend oral proceedings pursuant to Rule 115(1) EPC dated Aug. 21, 2024 for Application No. 20 739 664.9, consisting of 8 pages.

K. L. Yeung et al.; Optimal Mobile-Determined Micro-Macro Cell Selection; IEEE; 1995; Consisting of 6 pages.

X. Zhao et al.; Flexible Network Support for Mobility; ACM; XP-000850264; 1998; Dallas, Texas; consisting of 12 pages.

Anonymous: "Revolution Wi-fi: CAPWAP Split-MAC Architecture Overview", Nov. 23, 2010, consisting of 3 pages.

Non-Final Office Action issued in U.S. Appl. No. 18/004,725, filed Jan. 9, 2023, consisting of 42 pages.

* cited by examiner

400a

400b

MULTI-LINK COMMUNICATION IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/EP2020/069602, filed Jul. 10, 2020 entitled "MULTI-LINK COMMUNICATION IN A WIRELESS COMMUNICATION NETWORK," the entirety of which is incorporated herein by reference.

TECHNICAL FIELD

The present disclosure relates generally to the field of wireless communication. More particularly, it relates to multi-link communication in a wireless communication network.

BACKGROUND

Typically, when a station (STA) transitions from one Basic Service Set (BSS) comprising an Access Point (AP) to the next BSS it loses connectivity and needs to re-associate completely with the new AP in the next BSS for providing a connection to a Distribution System (DS).

One example of handling lost connectivity when transitioning from one BSS to the next BSS is the use of a Fast BSS Transition (FT) protocol, wherein the FT protocol seeks to reduce the duration that connectivity is lost between the STA and the DS during a BSS transition (reference to 2016—IEEE 802.11 Wireless LAN Medium Access Control and Physical Layer (PHY) Specifications).

Another example of handling lost connectivity when transitioning from one base station to the next base station, is the use of soft handovers in Wide-band Code-Division Multiple Access (WCDMA) wherein soft handovers work by always making sure that a user equipment (UE), e.g., terminal or STA in Wi-Fi, is always connected towards at least one base station. That is, a connection to the first base station is not teared down until a connection to the second base station has been established.

A first drawback of lost connectivity during transition is that it is difficult to ensure data continuity and low latency during transitions between APs.

A second drawback of lost connectivity during transition is that a rather large amount of message exchanges is needed before data transmissions can start when re-associating with a new AP, which causes large delays.

A third drawback of lost connectivity during transition is that non-empty data buffers at the AP where connection is lost may be problematic.

A fourth drawback of lost connectivity during transition is so-called ping-ponging when performing handover, where repeated mobility between two BSS:s might cause a large amount of service interruption due to re-associating multiple times in a short time span.

The IEEE 802.11 working group has previously had limited focus on mobility and lost connectivity during transition between APs.

The IEEE 802.11 working group has recently begun development of an enhancement called Extremely High Throughput (EHT). The enhancement EHT introduces new features, and one of these new features is multi-link (reference to Compendium of straw polls and potential changes to the Specification Framework Document in IEEE P802.11

Wireless LAN https://mentor.ieee.org/802.11/dcn/20/11-20-0566-23-00be-compendium-of-straw-polls-and-potential-changes-to-the-specification-framework-document.docx).

Therefore, there is a need for approaches for multi-link communication in a wireless communication network.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an apparatus is referred to herein, it is to be understood as a physical product. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a system for multi-link communication in a wireless communication network, wherein the wireless communication network comprises a first node and a second node.

The system comprises a device configured to be connected to the first node and the second node, wherein the first node and the second node are located in different entities in the wireless communication network.

The system further comprises a controller configured to cause initiation and establishment of a multi-link connection, wherein the multi-link comprises at least two links connecting the device with the first node and/or the second node and wherein each link is configured to communicate with the first node and/or the second node.

The first node in the system is configured to transmit a request for establishing the multi-link connection to the second node.

The second node in the system is configured to cause and transmit a confirmation for establishing the multi-link connection to the first node and/or the device at reception of the request.

The first node and the second node in the system, at establishment of the multi-link connection, are configured to function as a node entity associated with the device and configured to cause communication with the device over the multi-link connection.

In some embodiments, the controller is further configured to cause determination of a need in the device and/or in the first node for a multi-link connection.

In some embodiments, the controller is comprised in the device and/or in the first node.

In some embodiments, when the controller is comprised in the first node, the first node initiates the request for establishing the multi-link connection.

In some embodiments, when the controller is comprised in the device, the device initiates the request for establishing the multi-link connection to the first node.

In some embodiments, the first node transmits a confirmation for establishing the multi-node connection to the device at receipt of the confirmation from the second node.

In some embodiments, when the first node and the second node function as a node entity, the first node is further configured to manage secret keys and data distribution in a first link of the multi-link connection.

In some embodiments, when the first node and the second node function as a node entity, the second node is further configured to relay or repeat data in a second link of the multi-link connection.

In some embodiments, when the first node and the second node function as a node entity, the first node is further configured to control a data flow in the second node by a split in the communication stack of the second node.

In some embodiments, the split in the communication stack comprises a split between Medium Access Control, MAC, and Physical Layer, PHY.

In some embodiments, the split in the communication stack comprises a split between an upper MAC and a lower MAC.

In some embodiments, the multi-link connection is established temporarily for enabling a seamless handover in the transition between the first node and the second node.

In some embodiments, the multi-link connection is established to improve reliability in data transfer involving the first node and/or the second node.

In some embodiments, the multi-link connection is established by firstly connecting the device with a link to the first node and secondly by connecting the device with a link to the second node.

In some embodiments, the controller is further configured to terminate the multi-link connection and de-associate the links with the device.

In some embodiments, the multi-link connection is terminated and the links are de-associated by performing multi-link teardown to disconnect the links from the first node.

In some embodiments, the first node empties its buffer and/or session before performing the multi-link teardown.

In some embodiments, the multi-link connection is re-established and the links are associated with the second node.

In some embodiments, the device signals its multi-link multi-node capabilities to other devices and/or nodes in the wireless communication network.

In some embodiments, the device comprises a station, STA.

In some embodiments, the first node and the second node signal their multi-link multi-node capabilities to other nodes and/or devices in the wireless communication network.

In some embodiments, the first node and the second nodes comprise access points, APs.

In some embodiments, the wireless communication network is configured for Wi-Fi communication.

A second aspect is an apparatus for multi-link communication in a wireless communication network, wherein the wireless communication network comprises a first node and a second node, and a device configured to be connected to the first node and the second node, and wherein the first node and the second node are located in different entities in the wireless communication network.

The apparatus being configured to cause initiation of a multi-link connection, wherein the multi-link comprises at least two links connecting the device with the first node and/or the second node and wherein each link is configured to communicate with the first node and/or the second node, and transmittal of a request for establishing the multi-link connection to the second node.

The controller is further configured to cause reception of a confirmation for establishing the requested multi-link connection, and establishment of the multi-link connection.

The first node and the second node, at establishment of the multi-link connection, function as a node entity associated with the device and configured to communicate with the device over the multi-link connection.

In some embodiments, the apparatus is further configured to cause determination of a need in the device and/or in the first node for a multi-link connection.

In some embodiments, the apparatus is further configured to signal its multi-link multi-node capabilities to devices and/or nodes in the wireless communication network.

A third aspect is a node comprising the apparatus according to the second aspect.

A fourth aspect is a method for multi-link communication in a wireless communication network, wherein the wireless communication network comprises a first node and a second node, and a device configured to be connected to the first node and the second node, and wherein the first node and the second node are located in different entities in the wireless communication network.

The method comprises initiating, by the first node and/or the device, a multi-link connection, wherein the multi-link comprises at least two links connecting the device with the first node and/or the second node and wherein each link is configured to communicate with the first node and/or the second node, and transmitting, by the first node, a request for establishing the multi-link connection to the second node.

The method further comprises receiving, by the first node and/or the device, a confirmation for establishing the requested multi-link connection, and establishing, by the first node, the multi-link connection.

The first node and the second node, at establishment of the multi-link connection, function as a node entity associated with the device and configured to communicate with the device over the multi-link connection.

In some embodiments, the method further comprises determining, by the first node and/or the device, a need in the device or in the first node for a multi-link connection.

A fifth aspect is a computer program product comprising a non-transitory computer readable medium, having thereon a computer program comprising program instructions. The computer program is loadable into a data processing unit and configured to cause execution of the method according to the fourth aspect when the computer program is run by the data processing unit.

Any of the above aspects may additionally have features identical with or corresponding to any of the various features as explained above for any of the other aspects.

An advantage of some embodiments is that approaches for multi-link communication in a wireless communication network are provided.

An advantage of some embodiments is that seamless connectivity across multiple nodes in a wireless communication network is provided.

An advantage of some embodiments is that reliability and robustness during transitions between APs is improved.

An advantage of some embodiments is that data continuity and low latency during transitions between APs is ensured.

An advantage of some embodiments is that the large delays are mitigated by reducing the large amount of message exchanges needed.

An advantage of some embodiments is that non-empty data buffers at the AP where connection is lost are handled before the connection is lost.

An advantage of some embodiments is that so-called ping-ponging when performing handover causing a large amount of service interruption is mitigated.

An advantage of some embodiments is that the complexity of the approaches for multi-link communication is considerably lower than for joint transmission.

An advantage of some embodiments is that the requirements on the device(s) are considerably lower than for joint transmission.

An advantage of some embodiments is that links in the multi-link are seen as one AP for the device, e.g., a STA, which simplifies aspects such as associations, authentication, and security key management.

An advantage of some embodiments is that the multi-link may be used to offload a link to another AP in order to alleviate traffic at an AP.

It should be noted that, even if embodiments are described herein in the context of multi-link communication in a wireless communication network, some embodiments may be equally applicable and/or beneficial also in other contexts.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
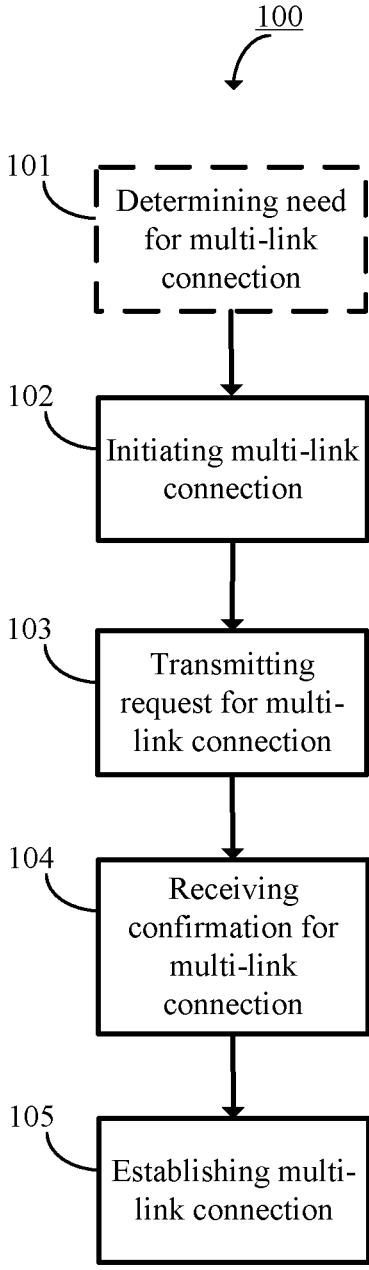
FIG. 1 is a flowchart illustrating example method steps according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, the FT protocol seeks to reduce the duration that connectivity is lost between the STA and a DS during a BSS transition.

The FT protocol is part of the re-association service and only apply to STA transitions between APs within the same mobility domain within the same Extended Service Set (ESS). Using the FT protocol, the FTO (Fast Transition Originator) STA alleviates the association with a target AP by communicating indirectly to the target AP via the current AP. Hence, as mentioned above, the FT protocol speed up the transition procedure.

As mentioned above, soft handovers in WCDMA work by always making sure that the UE, e.g., terminal or STA in Wi-Fi, is always connected towards at least one base station.

In WCDMA this is enabled by having the UE maintain what is denoted as an Active Set which is defined as a set of radio links by which the UE can communicate with, where all of the base-stations within this set must be on the same frequency (reference to 3GPP TR 25.922, Radio Resource Management Strategies (Release 7), V7.1.0 (2007-03)).

In soft handovers, the UE also maintains a Monitored Set which are the set of cells that are monitored before they enter in to the Active Set. The UE will report measurements of the monitored set whereby the network will make decisions on whether to establish and add an active set link, thus both the monitored and active set can only be added or removed by the network (reference to 3GPP TS 25.331, Radio Resource Control (RRC) (Release 16), V16.0.0, (2020-03)).

As mentioned above, the IEEE 802.11 working group has begun development of EHT, wherein EHT introduces new features, and one of these new features being multi-link operation, hereinafter denoted multi-link for short.

The purpose of multi-link is to enable a device to operate and send data on multiple links simultaneously or semi-simultaneously, depending on its capability to transmit and receive simultaneously.

Multi-link aims to enable aggregation of bandwidth as well as lower latency through faster channel access. Using multi-link, a MAC Protocol Data Unit (MPDU) Sequence Number (SN) is shared across the links and this effectively means that if a MPDU is not correctly decoded on one link, it can be retransmitted on another link.

In IEEE, Multi-AP coordination will likely be of two types. The first type will be a simpler one with only limited coordination features between two AP. The second type will be an advanced one and may support what is referred to as Joint Transmission (JT).

JT is a distributed Multi-user MIMO (MU-MIMO) system where several APs act jointly as a large antenna array. Using JT, improved robustness may also be obtained. However, JT is quite complex and it is still not clear how it may work for Wi-Fi.

In the Compendium of straw polls and potential changes to the Specification Framework Document in IEEE P802.11

Wireless LAN (reference to https://mentor.ieee.org/802.11/dcn/20/11-20-0566-23-00be-compendium-of-straw-polls-and-potential-changes-to-the-specification-framework-document.docx), it was decided that block acknowledgement agreements may be shared across links, meaning that the SN space used for data transmission across the links will be shared. This in turn means that if the links are distributed across different nodes, it will be possible to ensure seamless connectivity across multiple nodes.

In the following, embodiments will be presented where approaches for multi-link communication in a wireless communication network are described.

Generally, even if exemplification is made using a context for IEEE 802.11, it should be noted that some embodiments are equally applicable in other contexts, e.g., multi-link within a context of Third Generation Partnership Project (3GPP) standards.

Node, as described herein, may typically comprise a node in a wireless communication network, wherein the node may typically comprise an access point.

For example, an access point may comprise a base station, or stand-alone device that plug into a router or switch etc.

Device, as described herein, may typically comprise a station or a fixed, mobile, or portable client device that has the capability to use the IEEE 802.11 protocol.

For example, a station may be a computer, laptop, or smart phone etc.

It should be noted that, even if embodiments are described herein in the context of seamless connectivity across multiple nodes by multi-link communication in a wireless communication network, some embodiments may be equally applicable and/or beneficial also in other contexts of multi-link communication in a wireless communication network.

It should further be noted that, even if embodiments are described herein in the context of a first node and a second node in a wireless communication network, some embodiments may be equally applicable and/or beneficial also in other contexts wherein there are multiple nodes in the wireless communication network.

It should furthermore be noted that, even if embodiments are described herein in the context of a device being connected to a first node and a second node in a wireless communication network, some embodiments may be equally applicable and/or beneficial also in other contexts wherein the device is connected to multiple nodes in the wireless communication network.

In EHT, a multi-link capable AP is denoted MLD AP entity.

A MLD AP entity comprises multiple APs, one AP per link. To enhance understanding, we refer to APs that are not co-located as AP nodes. An AP node 1 is located in a different entity than an AP node 2. However, as will be described later herein, AP node 2 may be used to form the MLD AP1 entity, i.e., a node entity.

For example, AP node X refers to a physical AP which is not necessarily co-located with an AP node Y. A MLD AP X refers to a logical MLD which may comprise non co-located physical AP nodes.

FIG. 1 is a flowchart illustrating method steps of an example method 100 according to some embodiments. The method 100 is for multi-link communication in a wireless communication network, wherein the wireless communication network comprises a first node and a second node, and a device configured to be connected to the first node and the second node, and wherein the first node and the second node are located in different entities in the wireless communication network. Thus, the method 100 (or steps thereof) may, for example, be performed by the apparatus 700 and/or the controller 710 of FIG. 7; all of which will be described later herein.

The method 100 comprises the following steps.

In optional step 101, in some embodiments, a need in the device or in the first node for a multi-link connection is determined by the first node and/or the device.

In step 102, a multi-link connection is initiated by the first node and/or the device, wherein the multi-link comprises at least two links connecting the device with the first node and/or the second node and wherein each link is configured to communicate with the first node and/or the second node.

In step 103, a request for establishing the multi-link connection is transmitted by the first node to the second node.

In step 104, a confirmation for establishing the requested multi-link connection is received by the first node and/or the device.

For example, the confirmation may be received at the device from the first node.

For example, the confirmation may be received at the first node from the second node.

Alternatively or additionally, the confirmation may be received at the device from the second node.

In step 105, the multi-link connection is established by the first node, wherein the first node and the second node, at establishment of the multi-link connection, function as a node entity associated with the device and configured to communicate with the device over the multi-link connection.

Any of the above steps for FIG. 1 may additionally have features which are identical with or corresponding to any of the various features as explained below for FIGS. 2a-c, 4a-g, 5a-b, 6a-b, and 7 as suitable.

Figure 2A:
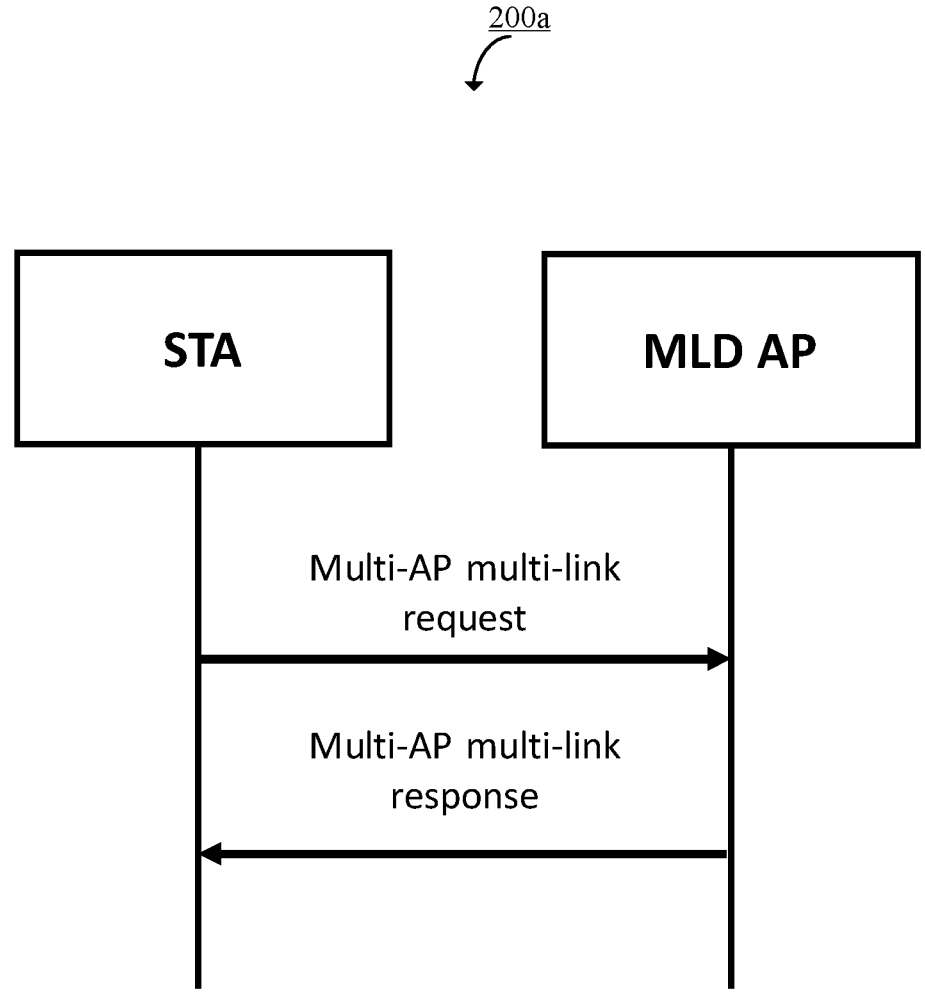
FIG. 2*a* is a sequence diagram illustrating example sequence steps according to some embodiments.

FIG. 2a is a sequence diagram illustrating example sequence steps of an example sequence 200a according to some embodiments. The sequence 200a is for multi-link communication in a wireless communication network, wherein the wireless communication network comprises a first node and a second node, and a device configured to be connected to the first node and the second node, and wherein the first node and the second node are located in different entities in the wireless communication network. Thus, the sequence 200a (or steps thereof) may, for example, be performed by the apparatus 700 and/or the controller 710 of FIG. 7; all of which will be described later herein.

FIG. 2a illustrates a multi-AP multi-link response/request sequence.

The multi-AP multi-link request may for instance be signaling that is specific for the non-co-located multi-AP scenario or it can be an extension of current signaling.

The multi-AP multi-link request can contain the following:

Which AP that the STA wants to connect to,

MAC address of the STA—used for target AP to know which STA to talk to,

Multi-link multi-AP capabilities of the STA, such as:

Simultaneous Transmit and Receive (STR) capabilities,

Capabilities (e.g., capability information as described below),

Link/Channel information, which can for instance be:

The link/channel where the STA prefers to connect to, including the bandwidth,

Measurements performed on the link/channel, such as SINR or transmission power,

The multi-AP multi-link response can contain the following:

ACK/NACK of connection, which can be a simple yes or it can be conditional, for instance that certain things need to be fulfilled or that certain options exist, Multi-link multi-AP capabilities of the target AP, such as:

Simultaneous Transmit and Receive (STR) capabilities,

Capabilities (e.g., capability information as described below)

Link/Channel information:

Acknowledgement that the preferred channel can be used,

Redirection to a different link/channel,

Additional information:

How long the STA has to start using the link,

Supported code rates.

Alternatively or additionally, in order to establish this multi-link, it needs to be established that this type of network set up is possible. Therefore, in one embodiment, the AP signals that this type of network setup is possible, meaning that the STA is allowed to initiate the type of multi-link establishment. Furthermore, it can also be signaled to what other APs that this multi-AP multi-link connection is possible.

Due to the possible increased complexity in synchronization, where the STA in a non-co-located multi-AP scenario will have to synchronize to two different nodes, it might not be possible for all STAs to be able to handle a non-co-located multi-AP connection. Thus, in another embodiment, the STA will signal its capabilities to handle non-co-located multi-AP connection. This type of capability information may include the maximum distance between the two multi-link nodes that are possible before synchronization becomes too difficult.

Alternatively or additionally, it might be possible for an AP to include in the capability information a list of neighboring APs that are candidates for a multi-link multi-node operation.

Any of the above steps for FIG. 2a may additionally have features which are identical with or corresponding to any of the various features as explained below for FIGS. 1, 2b-c, 4a-g, 5a-b, 6a-b, and 7 as suitable.

Figure 2B:
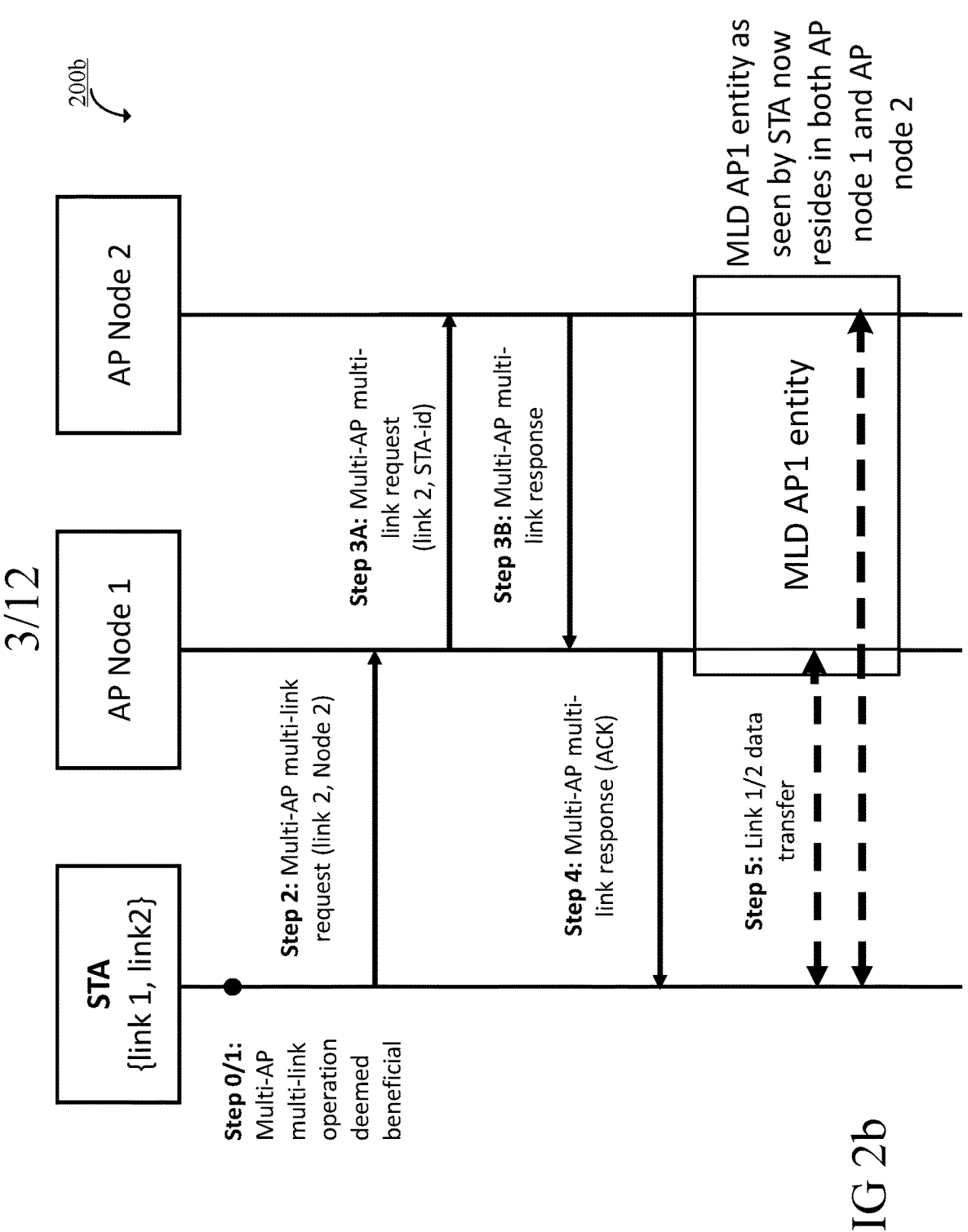
FIG. 2*b* is a sequence diagram illustrating example sequence steps according to some embodiments.

FIG. 2b is a sequence diagram illustrating example sequence steps of an example sequence 200b according to some embodiments. The sequence 200b is for multi-link communication in a wireless communication network, wherein the wireless communication network comprises a first node and a second node, and a device configured to be connected to the first node and the second node, and wherein the first node and the second node are located in different entities in the wireless communication network. Thus, the sequence 200b (or steps thereof) may, for example, be performed by the apparatus 700 and/or the controller 710 of FIG. 7; all of which will be described later herein.

FIG. 2b illustrates a STA-initiated establishment procedure for establishing a multi-AP multi-link connection.

In one embodiment, the STA is associated to an AP node 1 (logically comprised in MLD AP1). The STA initiates the multi-AP link connection, which then requests MLD AP1 to move one of its links to another AP node 2, not co-located with MLD AP1.

As an example, the below steps are explained:

In step 0: the STA has determined that MLD AP1 is capable of multi-AP multi-link connection.

In step 1: the STA detects that it would be beneficial to establish a multi-AP multi-link connection to AP node 2. This can for instance be detected through the STA doing measurements on neighboring AP/node beacons (i.e. AP node 2), and determining that the signal strength is larger to AP node 2 than AP node 1, or determining that the signal strength to AP node 2 is sufficient enough to establish a multi-AP multi-link so that diversity benefits can be achieved.

In step 2: the STA sends an indication to AP node 1 that it would be beneficial to establish a multi-AP multi-link connection with AP node 2.

In step 3: the AP node 1 sends an inter-AP message through the DS to AP node 2 that it would like to establish/off-load a multi-AP multi-link connection. The AP node 2 then responds with a confirmation or denial.

In step 4: AP node 1 responds with an acknowledgement or denial to the STA.

In step 5: data can now be transmitted.

Any of the above steps for FIG. 2b may additionally have features which are identical with or corresponding to any of the various features as explained below for FIGS. 1, 2a, 2c, 4a-g, 5a-b, 6a-b, and 7 as suitable.

Figure 2C:
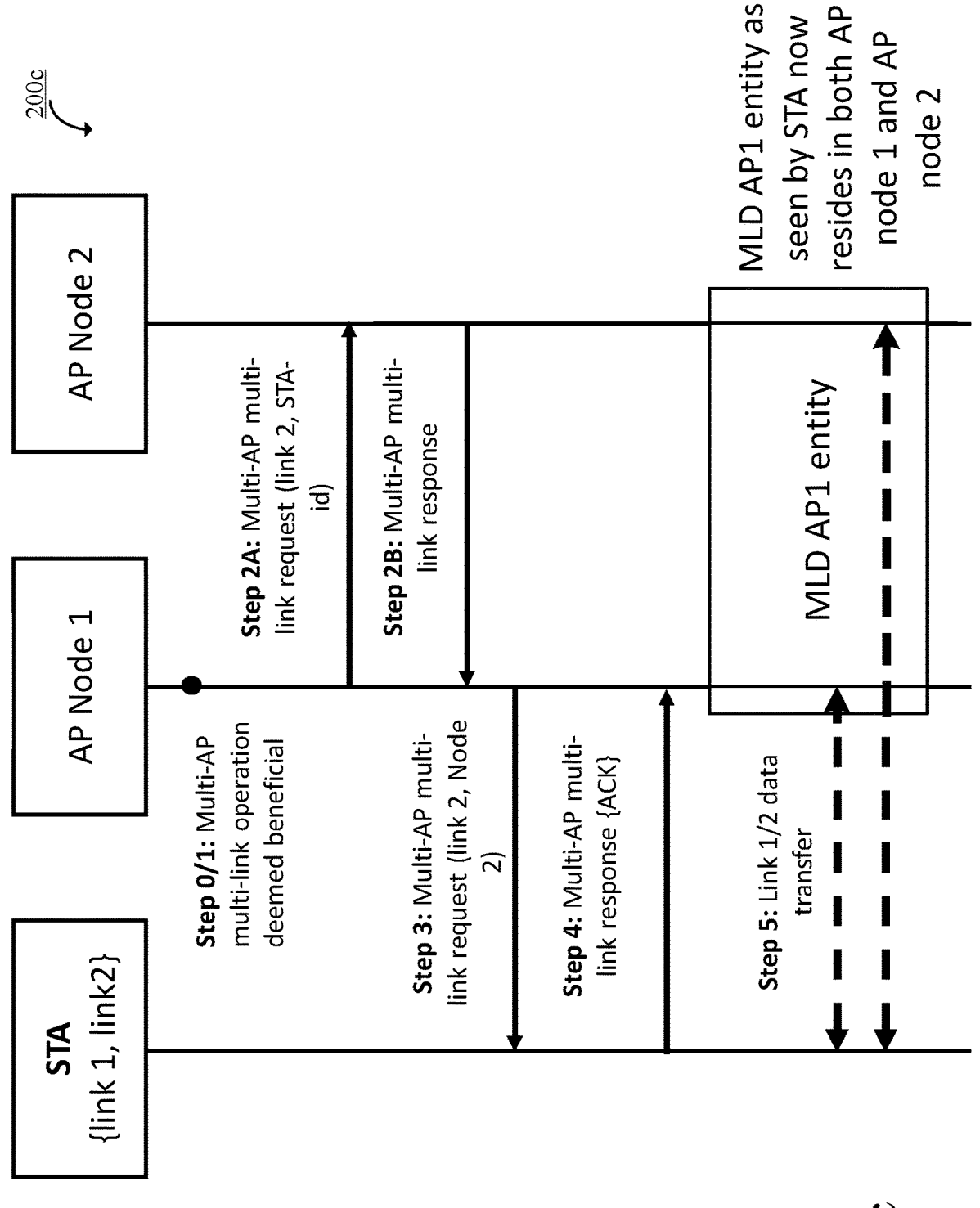
FIG. 2*c* is a sequence diagram illustrating example sequence steps according to some embodiments.

FIG. 2c is a sequence diagram illustrating example sequence steps of an example sequence 200c according to some embodiments. The sequence 200c is for multi-link communication in a wireless communication network, wherein the wireless communication network comprises a first node and a second node, and a device configured to be connected to the first node and the second node, and wherein the first node and the second node are located in different entities in the wireless communication network. Thus, the sequence 200c (or steps thereof) may, for example, be performed by the apparatus 700 and/or the controller 710 of FIG. 7; all of which will be described later herein.

FIG. 2c illustrates an AP-initiated establishment procedure for establishing a multi-AP multi-link connection.

In one embodiment, the AP node 1 initiates the multi-AP multi-link connection to an AP node 2 and then moves one of its links to the other AP node 2.

As an example, the below steps are explained:

In step 0: the AP node 1 has determined that the STA is capable of multi-AP multi-link connection.

In step 1: the AP node 1/AP node 2 distributed algorithm detects that it would be beneficial that a multi-AP multi-link connection is established. This can for instance be done through:

Exchanging measurements between APs to determine that the STA is closer to another node, Asking the STA for a neighborhood report, Prediction based on previous movements, Fixed configuration of the AP to always work in a multi-AP multi-link operation (useful in networks with high reliability requirements), and Determining that off-loading would be helpful.

In step 2: the AP node 1 sends an inter-AP message to AP node 2 that it would like to establish/move a multi-AP multi-link connection with STA.

In step 3: the AP node 1 sends an indication to the STA that it would be beneficial that a multi-AP multi-link connection is established.

In step 4: the STA responds with a confirmation or denial.

In step 5: data can now be transmitted to both nodes.

Any of the above steps for FIG. 2c may additionally have features which are identical with or corresponding to any of the various features as explained below for FIGS. 1, 2a-b, 4a-g, 5a-b, 6a-b, and 7 as suitable.

Figure 3:
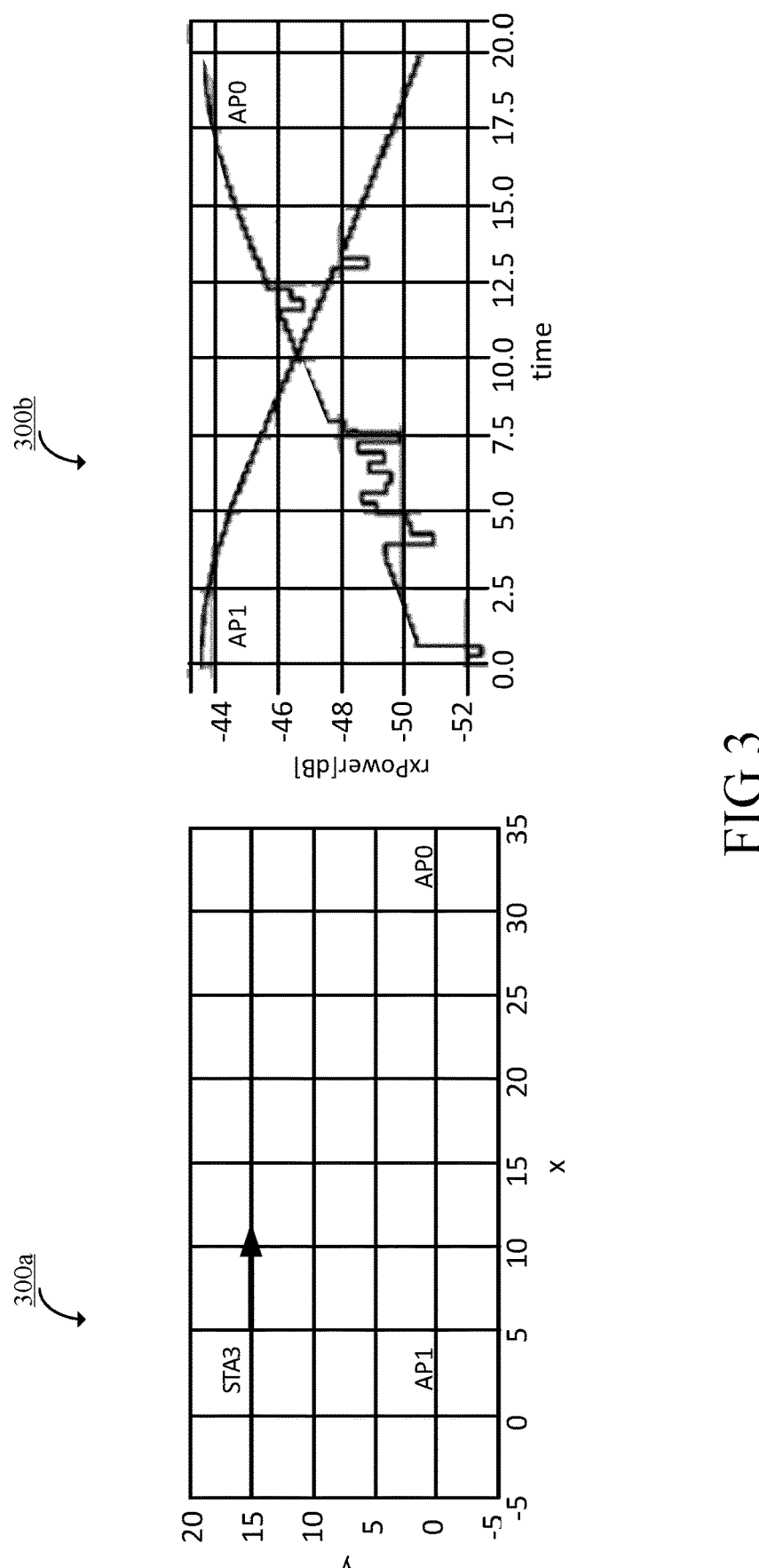
FIG. 3 is a schematic drawing illustrating example graphs according to some embodiments.

FIG. 3 is a schematic drawing illustrating example graphs 300a and 300b according to some embodiments. The graphs

300*a*, 300*b* illustrate mobility and the change in signal strength when a STA is moving.

Graph 300*a* illustrates the STA being connected with 2 links to two different APs that are spaced 30 meters apart (x-axis and y-axis being indicative of distance in meters, i.e., wherein the arrow in the grid is indicative of that the STA 0 moves from x=0,Y=15 to x=15,y=15).

Graph 300*b* illustrates when the STA moves in between the AP, and the signal power that can be seen to change (x-axis being indicative of time and y-axis being indicative of signal strength).

In a typical IEEE 802.11 scenario, a set of APs are deployed, e.g., AP 0 and AP 1. When a STA, e.g., STA 0, moves around in the network, it will typically have to change AP regularly to the AP that has the best signal strength. This is done by the STA based on measuring the received signal strength indication (RSSI) of neighboring AP's beacons and choosing the AP with the largest RSSI.

In a multi-link deployment, it is expected that the same type of mechanism for mobility will apply. This type of mobility when moving from current AP to target AP, the STA would have to disassociate with current AP and (re-)associate with a target AP, which causes a temporary loss of connection. The Fast BSS Transition, as described above, may help speed up this process.

The multi-link functionality primarily focuses on increasing peak data rates by utilizing multiple links between a current AP and the STA. Naturally, all links are likely to be highly correlated in terms of large-scale fading. What this means is that if one link goes down due to mobility and/or blocking objects, then the other link may also go down. Using multiple links where each link communicates with different AP is therefore an effective approach to improve robustness.

FIGS. 4*a-g* are schematic drawings illustrating example nodes according to some embodiments. The nodes in 400*a-g* are for multi-link communication in a wireless communication network, wherein the wireless communication network comprises a first node and a second node, and a device configured to be connected to the first node and the second node, and wherein the first node and the second node are located in different entities in the wireless communication network. Thus, the nodes in 400*a-g* (or components thereof) may, for example, perform steps of FIGS. 1 and 2*a-c*.

Figures 4A, 4B:
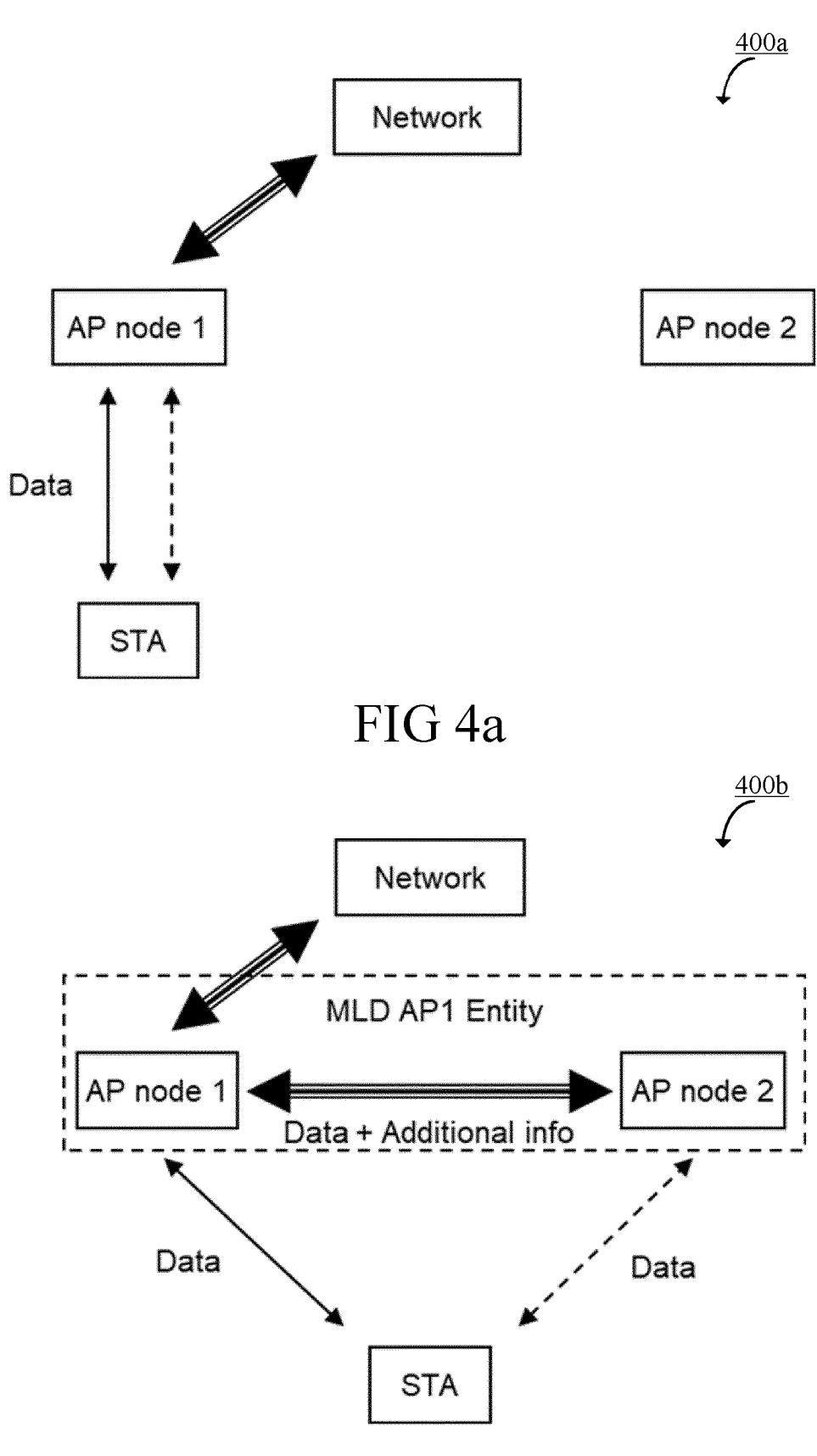
FIG. 4*a* is a schematic drawing illustrating example nodes according to some embodiments.
FIG. 4*b* is a schematic drawing illustrating example nodes according to some embodiments.

FIG. 4*a* illustrates a setup with 2 APs and 1 STA.

In an embodiment, the STA is associated with the multi-link device (MLD) entity AP1 and connected to the network through AP node 1 using two links. The STA has no or a very poor channel to AP node 2 and is therefore not associated to it.

In an attempt to move from AP node 1 to AP node 2, the STA is associated with AP node 1 in a multi-AP multi-link establishment mechanism.

FIG. 4*b* illustrates the STA being connected to the network through both AP node 1 and AP node 2 with one link each.

The STA is still associated with the MLD AP1 entity. However, the STA communicates data on a first, solid, link with AP node 1 and on a second, dashed, link with AP node 2.

Since AP node 1 and AP node 2 are configured to function as a single MLD AP1 entity, in this example, AP node 1 acts as a master of the communication session. This means that secret keys, data distribution, etc. are managed by AP node 1. Hence, AP node 2 can be considered a relay or repeater of the data for the second link. There are a couple of reasons why the second link is "relayed" from AP node 1 via AP node 2:

a) The MPDU SN space must be the same for both links. Therefore, some entity needs to know exactly which bits that go into which MPDUs (and which corresponding SN it has).

b) Natural to let AP node 1 be the distributer of the data session.

How AP node 1 is allowed to control the data flow through AP node 2 and where to split the communication stack is described later herein in relation to FIGS. 6*a* and 6*b*.

The link between AP node 1 and AP node 2 may be a fixed or a wireless backhaul link. Naturally the capacity of this link needs to be larger than the capacity of the link between the STA and AP node 2.

When the STA moves towards AP node 2 the multi-AP multi-link establishment procedure is performed.

From a robustness perspective, it is desirable to maintain links through multiple APs to a large extent (as long as the links are good enough).

Figures 4C, 4D:
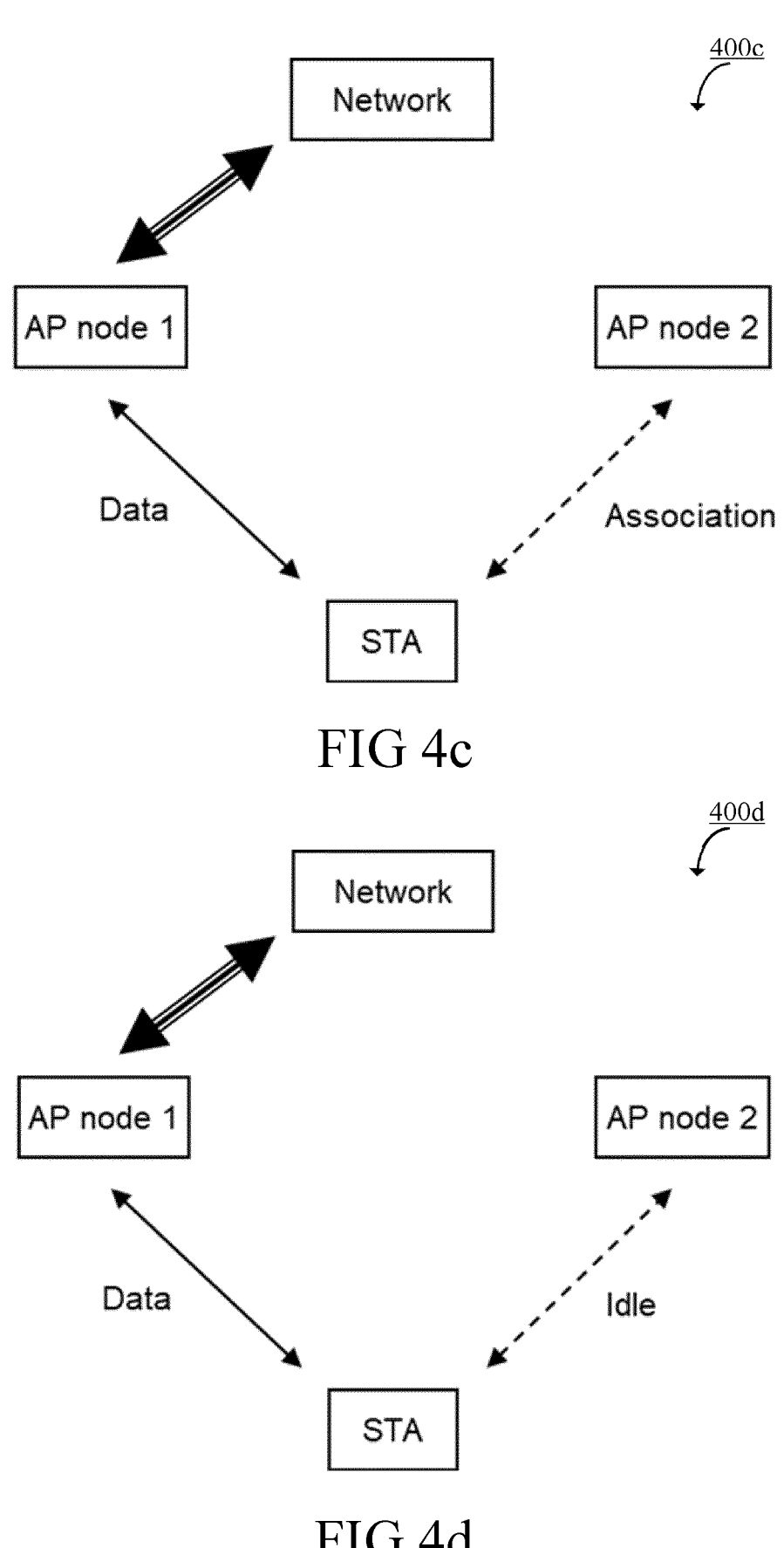
FIG. 4*c* is a schematic drawing illustrating example nodes according to some embodiments.
FIG. 4*d* is a schematic drawing illustrating example nodes according to some embodiments.

FIG. 4*c* illustrates that, at some point, the STA wants to associate with AP node 2. Before it associates, it performs a multi-AP multi-link request. After the request, the STA associates with AP node 2 while still receiving data from MLD AP1.

Note, it can also happen that the STA wants to move both links back to AP node 1. This can also be done with the multi-AP multi-link request.

FIG. 4*d* illustrates that, after association, as described and illustrated in FIG. 4*c*, the STA idles until AP node 1 has emptied its data buffers.

Figures 4E, 4F:
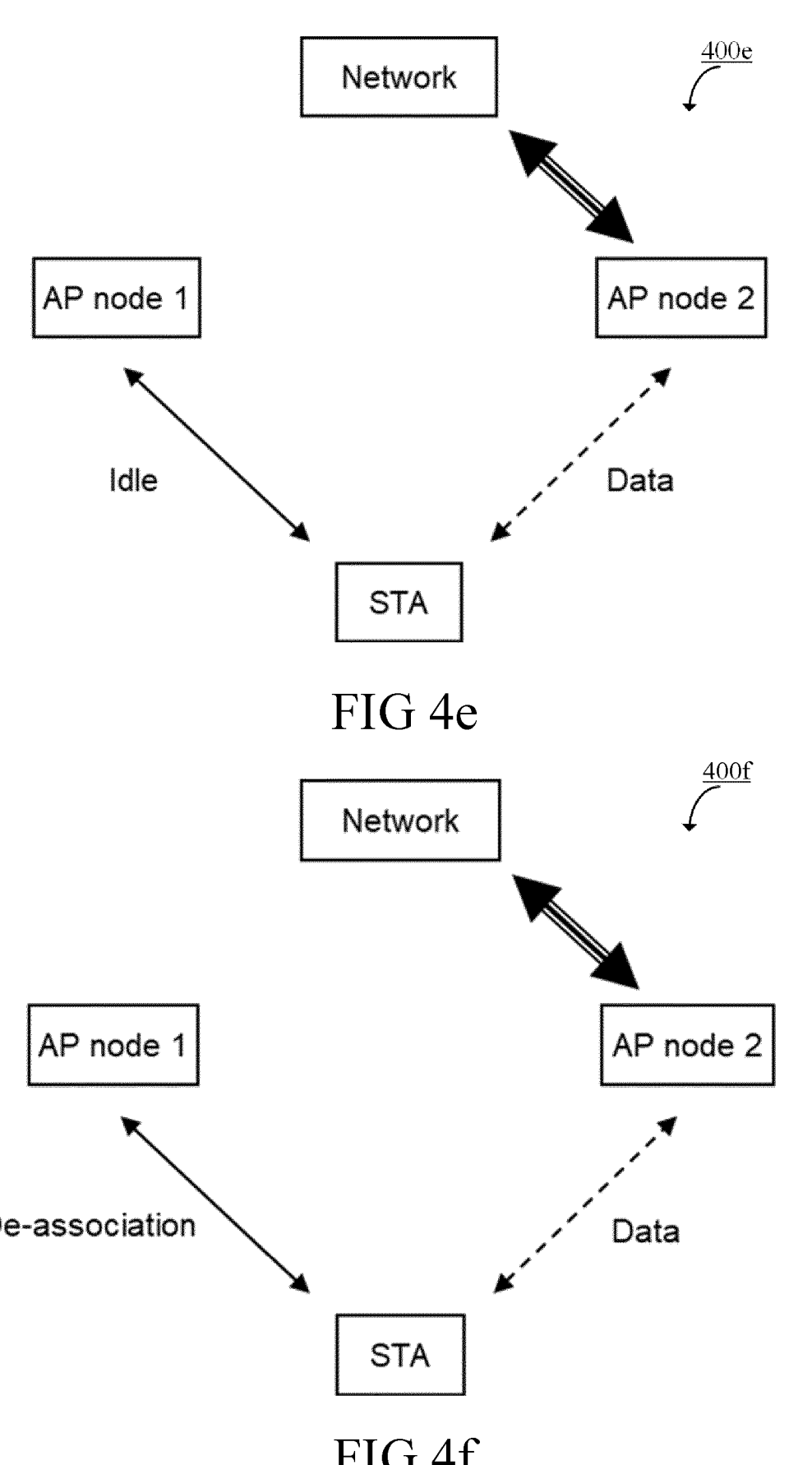
FIG. 4*e* is a schematic drawing illustrating example nodes according to some embodiments.
FIG. 4*f* is a schematic drawing illustrating example nodes according to some embodiments.

FIG. 4*e* illustrates that after emptying the data buffers in AP node 1, the STA requests data from AP node 2 instead. The first link then becomes idle.

FIG. 4*f* illustrates that when the first link becomes idle, the STA de-associates with AP node 1.

Figure 4G:
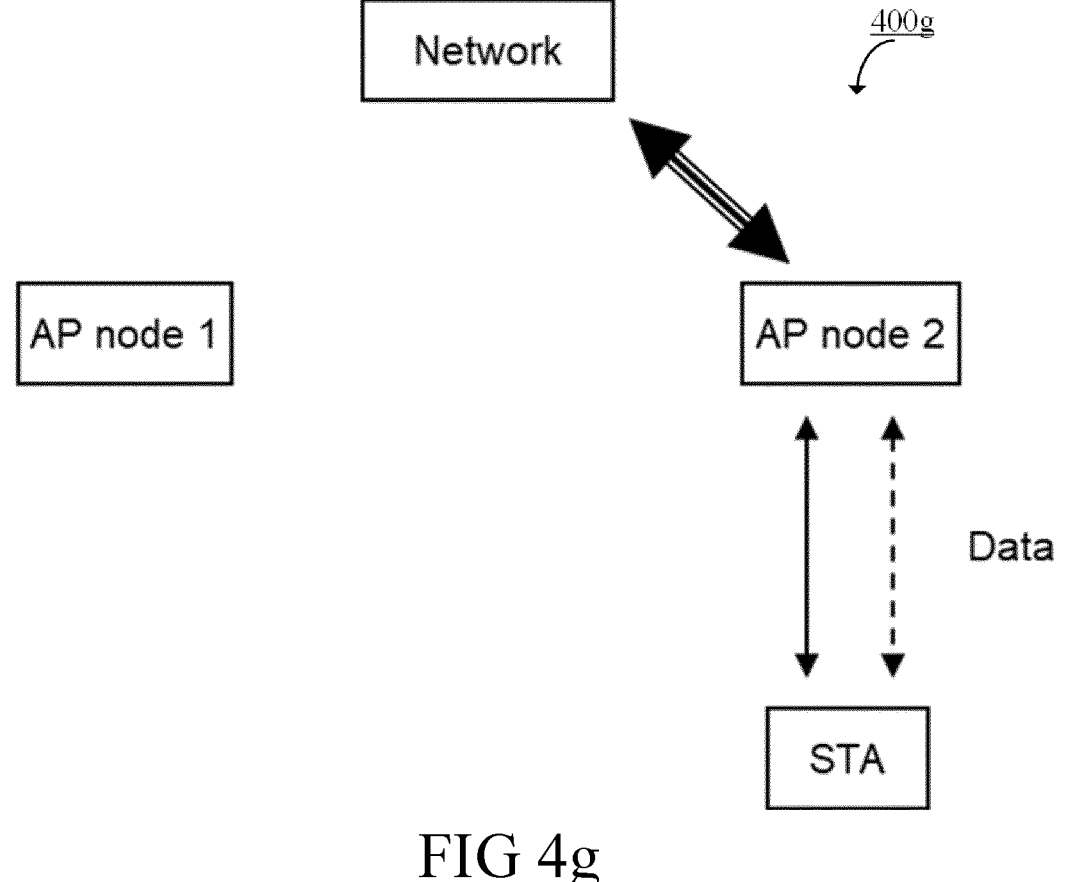
FIG. 4*g* is a schematic drawing illustrating example nodes according to some embodiments.

FIG. 4*g* illustrates that when the STA has de-associated with AP node 1, as a final step, the STA performs handover of the other link to AP2 and the STA now has both links directly to MLD AP2 entity.

Any of the above steps for FIGS. 4*a-g* may additionally have features which are identical with or corresponding to any of the various features as explained below for FIGS. 1, 2*a-c*, 4*a-g*, 5*a-b*, 6*a-b*, and 7 as suitable.

Figures 5A, 5B:
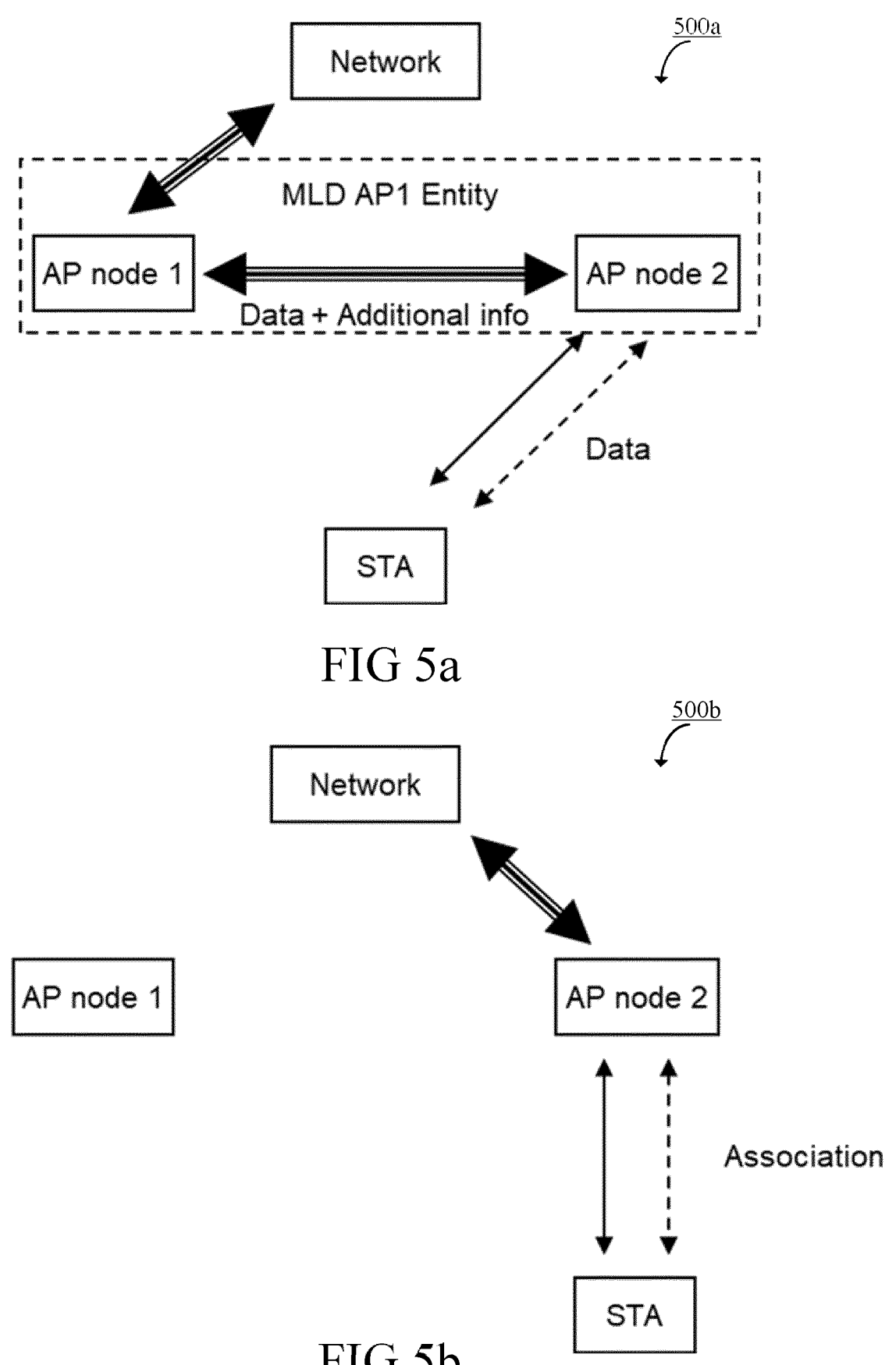
FIG. 5*a* is a schematic drawing illustrating example nodes according to some embodiments.
FIG. 5*b* is a schematic drawing illustrating example nodes according to some embodiments.

FIGS. 5*a-b* are schematic drawings illustrating example nodes according to some embodiments. The nodes in 500*a*-500*b* are for multi-link communication in a wireless communication network, wherein the wireless communication network comprises a first node and a second node, and a device configured to be connected to the first node and the second node, and wherein the first node and the second node are located in different entities in the wireless communication network. Thus, the nodes in 500*a*-500*b* (or components thereof) may, for example, perform steps of FIGS. 1 and 2*a-c*.

FIG. 5*a* illustrates a STA being connected to the network through both AP node 1 and AP node 2 with one link each (which is based on a setup with 2 APs and 1 STA (corresponding to FIG. 4*a*)).

In an embodiment, the STA is associated with the multi-link device (MLD) entity AP1 and connected to the network through AP node 1 using two links. The STA has no or a very poor channel to AP node 2 and is therefore not associated to it (not illustrated and corresponding to FIG. 4*a*).

In an attempt to move from AP node 1 to AP node 2, STA is associated with AP node 1 in a multi-AP multi-link request message is used to perform the handover.

It is decided that the link to AP node 1 is so poor that both links should be moved to AP node 2. The STA is still connected to the MLD AP1 entity.

From a robustness perspective, it is desirable to maintain links through multiple APs to a large extent (as long as the links are good enough).

FIG. 5*b* illustrates that once AP node 1 has emptied its buffer or session, the multi-AP multi-link teardown is performed to disconnect from MLD AP1. Immediately after the teardown, the STA associates with the MLD AP2 entity.

After association with the MLD AP2 the STA has both links only with AP node 2.

Figures 6A, 6B:
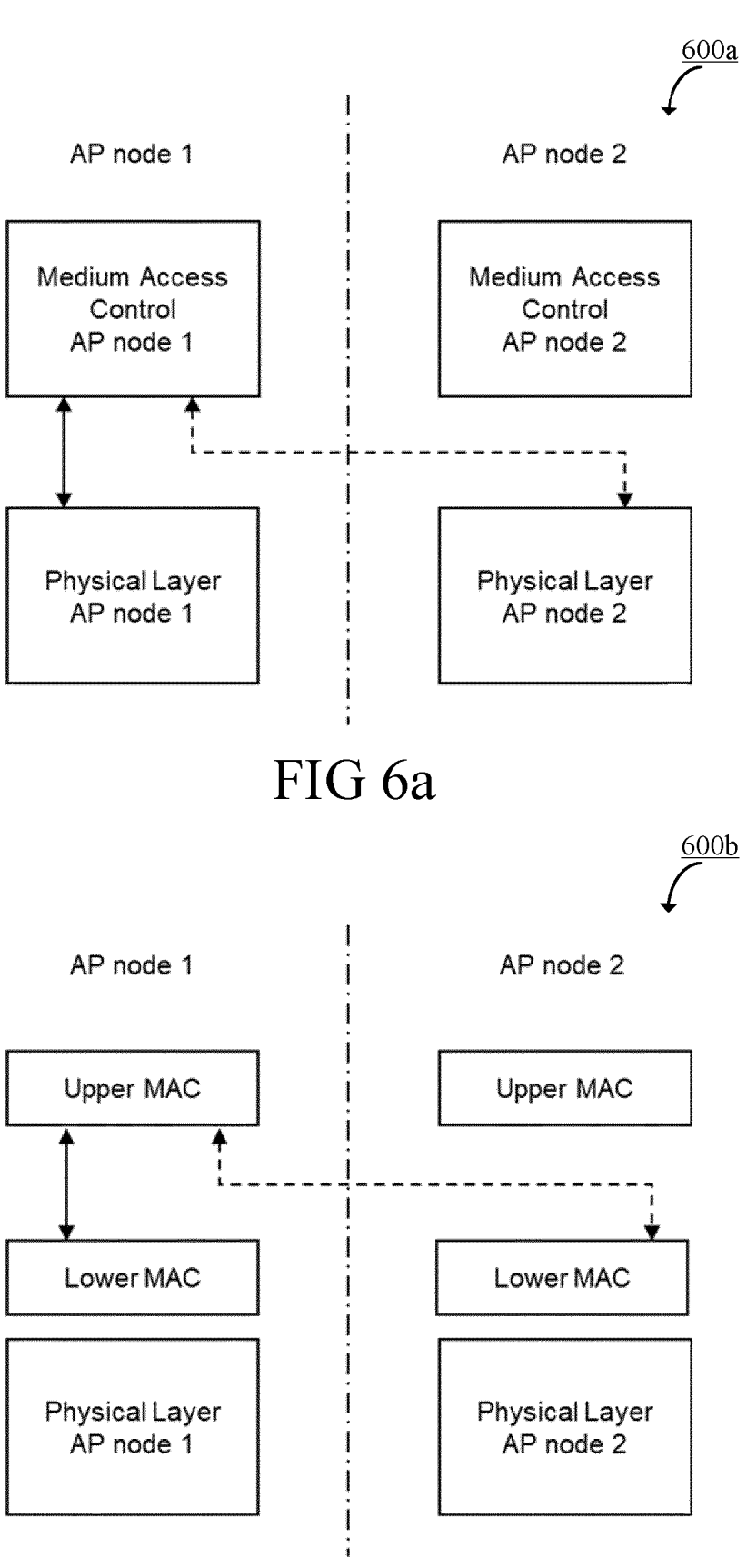
FIG. 6*a* is a schematic drawing illustrating example layers according to some embodiments.
FIG. 6*b* is a schematic drawing illustrating example layers according to some embodiments.

FIGS. 6*a-b* are schematic drawings illustrating example layers according to some embodiments. The node layers in 600*a*-600*b* are accessible for multi-link communication in a wireless communication network, wherein the wireless communication network comprises a first node and a second node, and a device configured to be connected to the first node and the second node, and wherein the first node and the second node are located in different entities in the wireless communication network. Thus, the nodes layers in 600*a* (or components thereof) may, for example, be accessible for performing steps of FIGS. 1, 2*a-c*, 4*a-g*, and 5*a-b*.

In order to allow for AP1 to control the data flow through AP2 (reference to FIG. 4*b*) and to split the communication stack appropriately, two alternatives are illustrated and described in FIG. 6*a* and in FIG. 6*b*.

FIG. 6*a* illustrates a split between AP node 1 and AP node 2 assuming only the PHY is used in AP node 2.

The split between MAC and PHY. This would mean that the full MAC of the second link resides inside AP1, but it is using the full PHY of AP node 2. The benefits of this split is that there is a clear interface between PHY and MAC. As such, the "Additional info" depicted in FIG. 4*b* is clear. This also means that link adaptation, backoff counters, etc. for the second link is taken care of by AP node 1.

FIG. 6*b* illustrates a split between MLD AP1 and MLD AP2 assuming the lower MAC is used at AP2.

The split between an upper MAC and a lower MAC. This would mean that AP node 2 may still manage channel access related procedures such as link adaptation and backoff counters. However, AP node 1 would still take care of security.

Figure 7:
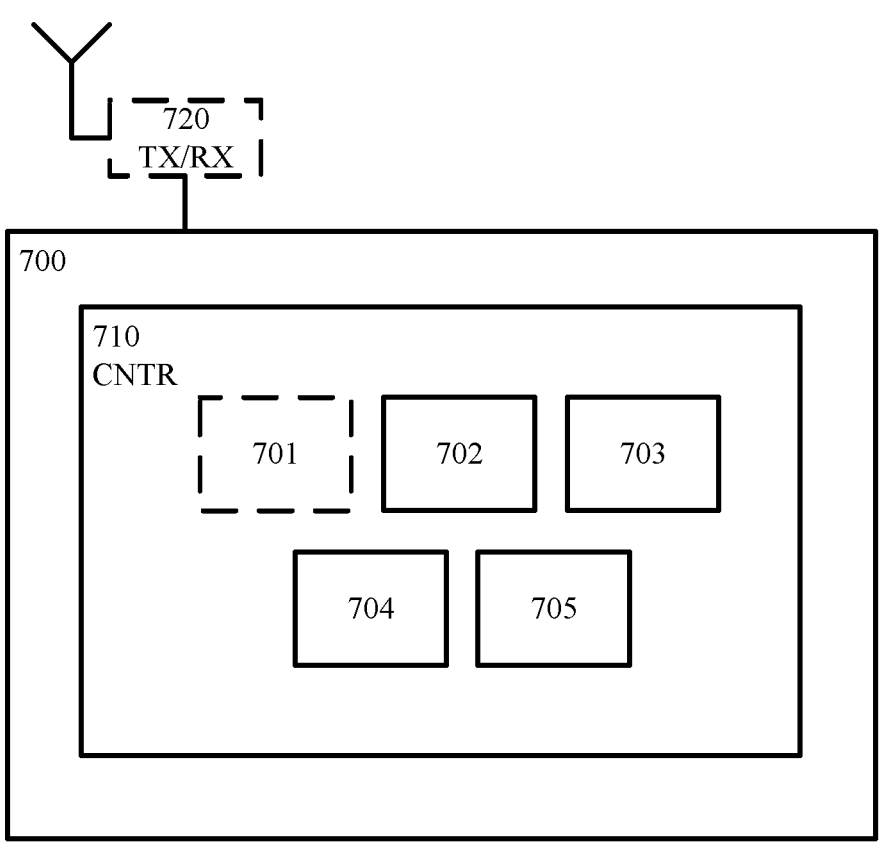
FIG. 7 is a schematic block diagram illustrating an example apparatus according to some embodiments.

FIG. 7 is a schematic block diagram illustrating an example apparatus 700 according to some embodiments. The apparatus 700 is for multi-link communication in a wireless communication network, wherein the wireless communication network comprises a first node and a second node, and a device configured to be connected to the first node and the second node, and wherein the first node and the second node are located in different entities in the wireless communication network. Thus, the apparatus 700 may, for example, perform steps of FIGS. 1 and 2*a-c* or otherwise described herein.

The apparatus 700 is configured to cause initiation of a multi-link connection, wherein the multi-link comprises at least two links connecting the device with the first node and/or the second node and wherein each link is configured to communicate with the first node and/or the second node.

The apparatus 700 is further configured to cause transmittal of a request for establishing the multi-link connection to the second node, and reception of a confirmation for establishing the requested multi-link connection.

The apparatus 700 is furthermore configured to cause establishment of the multi-link connection, and wherein the first node and the second node, at establishment of the multi-link connection, function as a node entity associated with the device and configured to communicate with the device over the multi-link connection.

In some embodiments, the apparatus 700 is furthermore configured to cause determination of a need in the device and/or in the first node for a multi-link connection.

In some embodiments, the apparatus 700 is furthermore configured to signal its multi-link multi-node capabilities to devices and/or nodes in the wireless communication network.

The apparatus 700 may comprise a controller (CNTR; e.g., control circuitry or a controlling module) 710, which may in turn comprise, (or be otherwise associated with; e.g., connected or connectable to), a initiator 702, e.g., initiating circuitry or initiating module, configured to initiate a multi-link connection, wherein the multi-link comprises at least two links connecting the device with the first node and/or the second node and wherein each link is configured to communicate with the first node and/or the second node (compare with step 102 of FIG. 1 and/or step 2 of FIG. 2*b* and/or step 2 FIG. 2*c*).

The controller 710 further comprises, (or is otherwise associated with; e.g., connected or connectable to), a transmitter 703, e.g., transmitting circuitry or transmitting module, configured to transmit a request for establishing the multi-link connection to the second node (compare with step 103 of FIG. 1 and/or step 3*a* of FIG. 2*b* and/or step 2*a* FIG. 2*c*).

The controller 710 further comprises, (or is otherwise associated with; e.g., connected or connectable to), a receiver 704, e.g., receiving circuitry or receiving module, configured to receive a confirmation for establishing the requested multi-link connection (compare with step 104 of FIG. 1 and/or step 3*b* of FIG. 2*b* and/or step 2*b* FIG. 2*c*).

The controller 710 further comprises, (or is otherwise associated with; e.g., connected or connectable to), an establisher 705, e.g., establishing circuitry or establishing module, configured to establish the multi-link connection, wherein the first node and the second node, at establishment of the multi-link connection, function as a node entity associated with the device and configured to communicate with the device over the multi-link connection (compare with step 105 of FIG. 1 and/or steps 4-5 of FIG. 2*b* and/or steps 3-5 FIG. 2*c*).

In some embodiments, the controller 710 furthermore comprises, (or is otherwise associated with; e.g., connected or connectable to), a determiner 701, e.g., determining circuitry or determining module, configured to determine a need in the device or in the first node for a multi-link connection (compare with step 101 of FIG. 1 and/or step 0/1 of FIG. 2*b* and/or step 0/1 FIG. 2*c*).

In some embodiments, the controller 710 furthermore comprises, (or is otherwise associated with; e.g., connected or connectable to), a transceiver TX/RX 720, e.g., transceiving circuitry or transceiving module, configured to transmit and receive information through multi-link communication in a wireless communication network.

In some embodiments, the wireless communication network is configured for Wi-Fi communication.

In some embodiments, the apparatus 700 and/or the controller 710 is completely or partially comprised in a node and/or in a device.

In some embodiments, the apparatus 700 and/or the controller 710 is completely or partially comprised in in a cloud environment.

Generally, when an apparatus is referred to herein, it is to be understood as a physical product. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), Graphics Processing Units (GPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 8:
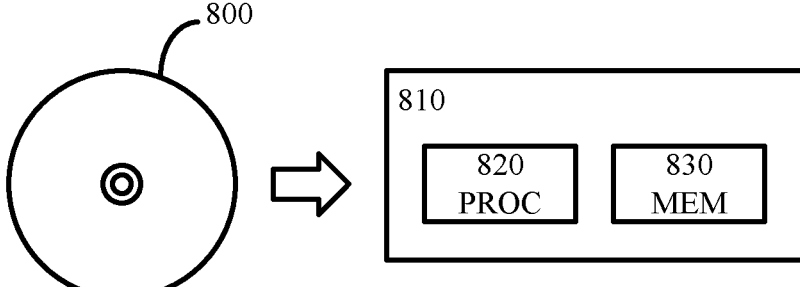
FIG. 8 is a schematic drawing illustrating an example computer readable medium according to some embodiments.

FIG. 8 illustrates an example computer readable medium in the form of a compact disc (CD) ROM 800. The computer readable medium has stored thereon a computer program comprising program instructions. The computer program is loadable into a data processor (PROC) 820, which may, for example, be comprised in a wireless communication device 810. When loaded into the data processor, the computer program may be stored in a memory (MEM) 830 associated with or comprised in the data processor.

In some embodiments, the computer program may, when loaded into and run by the data processing unit, cause execution of steps according to, for example, FIG. 1 and/or FIG. 2a-c and/or one or more of any steps otherwise described herein.

In some embodiments, the computer program may, when loaded into and run by the data processing unit, cause execution of steps according to, for example, FIG. 1 and/or FIG. 2a-c and/or one or more of any steps otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims.

Furthermore, some steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A system for multi-link communication in a wireless communication network, the wireless communication network having a first node and a second node, the system comprising:

a device configured to be connected to the first node and the second node, the first node and the second node being located in different physical entities in the wireless communication network and being configured as a single logical multi-link device (MLD) entity residing in both the first and second nodes;

a controller configured to cause initiation and establishment of a multi-link connection, the multi-link comprising at least two links connecting the device with one or both of the first node and the second node, each link being configured to communicate with the one or both of the first node and the second node;

the first node being configured to transmit a request for establishing the multi-link connection to the second node;

the second node being configured to cause and transmit a confirmation for establishing the multi-link connection between the device and the one or both of the first node and the second node at reception of the request; and the first node and the second node being configured to function as the single logical MLD entity, the single logical MLD entity being configured to cause communication with the device over multiple links of the multi-link connection.

2. The system according to claim 1, wherein the controller is further configured to cause determination of a need in the one or both of the device and the first node for a multi-link connection.

3. The system according to claim 1, wherein the controller is comprised in the one or both of the device and in the first node.

4. The system according to claim 1, wherein, when the controller is comprised in the first node, the first node initiates the request for establishing the multi-link connection.

5. The system according to claim 1, wherein, when the controller is comprised in the device, the device initiates the request for establishing the multi-link connection to the first node.

6. The system according to claim 1, wherein the first node transmits a confirmation for establishing the multi-node connection to the device at receipt of the confirmation from the second node.

7. The system according to claim 1, when the first node and the second node function as a node entity, the first node being further configured to manage secret keys and data distribution in a first link of the multi-link connection.

8. The system according to claim 1, when the first node and the second node function as a node entity, the second node being further configured to relay or repeat data in a second link of the multi-link connection.

9. The system according to claim 1, when the first node and the second node function as a node entity, the first node being further configured to control a data flow in the second node by a split in the communication stack of the second node.

10. The system according to claim 1, wherein the multi-link connection is established temporarily for enabling a seamless handover in the transition between the first node and the second node.

11. The system according to claim 1, wherein the multi-link connection is established to improve reliability in data transfer involving the one or both of the first node and the second node.

12. The system according to claim 1, wherein the multi-link connection is established by firstly connecting the device with a link to the first node and secondly by connecting the device with a link to the second node.

13. The system according to claim 1, wherein the controller is further configured to terminate the multi-link connection and de-associate the links with the device.

14. An apparatus for multi-link communication in a wireless communication network, the apparatus having a first node and a second node configured to be connected to a first device, the first node and the second node being located in different physical entities in the wireless communication network and being configured as a single logical multi-link device (MLD) entity residing in both the first and second nodes, the apparatus being configured to cause:

initiation of a multi-link connection, the multi-link comprising at least two links connecting the device with one or both of the first node and the second node, each link being configured to communicate with the one of both of the first node and the second node;

transmittal of a request for establishing the multi-link connection to the second node;

reception of a confirmation for establishing the requested multi-link connection;

establishment of the multi-link connection; and the first node and the second node, at establishment of the multi-link connection, functioning as the single logical MLD entity associated with the device and configured to communicate with the device over multiple links of the multi-link connection.

15. The apparatus according to claim 14, wherein the apparatus is further configured to cause determination of a need in the one or both of the device and the first node for a multi-link connection.

16. The apparatus according to claim 14, wherein the apparatus is further configured to signal its multi-link multi-node capabilities to the one of both of the devices and nodes in the wireless communication network.

17. A method for multi-link communication in a wireless communication network, the wireless communication network having a first node and a second node, and a device configured to be connected to the first node and the second node, the first node and the second node being located in different physical entities in the wireless communication network and being configured as a single logical node multi-link device (MLD) entity residing in both the first and second nodes, the method comprising:

initiating, by one or both of the first node and the device, a multi-link connection, the multi-link comprising at least two links connecting the device with the one or both of the first node and the second node, each link being configured to communicate with the one or both of the first node and the second node;

transmitting, by the first node, a request for establishing the multi-link connection to the second node;

receiving, by the one or both of the first node and the device, a confirmation for establishing the requested multi-link connection;

establishing, by the first node, the multi-link connection; and the first node and the second node functioning as the single logical MLD entity associated with the device and configured to communicate with the device over multiple links of the multi-link connection.

18. The method according to claim 17, further comprising determining, by the one or both of the first node and the device, a need in the device or in the first node for a multi-link connection.

* * * * *